United States Patent [19]

Hung et al.

[11] Patent Number: 5,792,237

[45] Date of Patent: Aug. 11, 1998

[54] METHOD AND APPARATUS FOR ELIMINATING TRAPPED AIR FROM A LIQUID FLOW

[75] Inventors: Cheng-chieh Hung, Taichung; Ming-chien Wen, Chiung-Lin; Mao-sheng Chuang, Shuang-Hsi-Hsiao-Cheng, all of Taiwan

[73] Assignee: Taiwan Semiconductor Manufacturing Co Ltd, Hsin-chu, Taiwan

[21] Appl. No.: 766,904

[22] Filed: Dec. 13, 1996

[51] Int. Cl.[6] ............................................ B01D 19/00
[52] U.S. Cl. .................... 95/24; 95/241; 95/254; 96/155; 96/157; 96/168; 96/204
[58] Field of Search ................. 95/241, 254, 260, 95/24; 96/157, 156, 155, 168, 183, 184, 204

[56] References Cited

U.S. PATENT DOCUMENTS

| | | | |
|---|---|---|---|
| 4,000,989 | 1/1977 | Dunegan | 96/204 |
| 4,266,950 | 5/1981 | Makino et al. | 96/204 |
| 4,315,760 | 2/1982 | Bij De Leij | 95/24 |
| 4,355,652 | 10/1982 | Perkins | 95/241 |
| 4,390,037 | 6/1983 | Perkins | 96/168 |
| 4,997,464 | 3/1991 | Kopf | 96/157 |
| 5,096,602 | 3/1992 | Yamauchi et al. | 95/241 |

*Primary Examiner*—Duane S. Smith
*Attorney, Agent, or Firm*—Tung & Associates

[57] ABSTRACT

A method and apparatus for eliminating trapped air from a liquid flow by using a buffer tank and an electrical control box such that substantially all the trapped air are accumulated in the buffer tank and further, when the tank is optionally equipped with a sensor system, the liquid flow can be shut-off when the liquid level in the buffer tank drops below a threshold level to prevent the trapped air from accidentally flowing into a process machine.

19 Claims, 1 Drawing Sheet

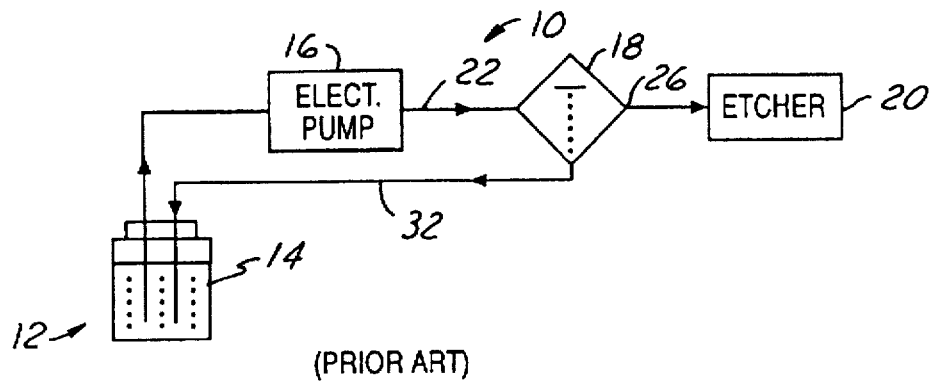
(PRIOR ART)
FIG. 1
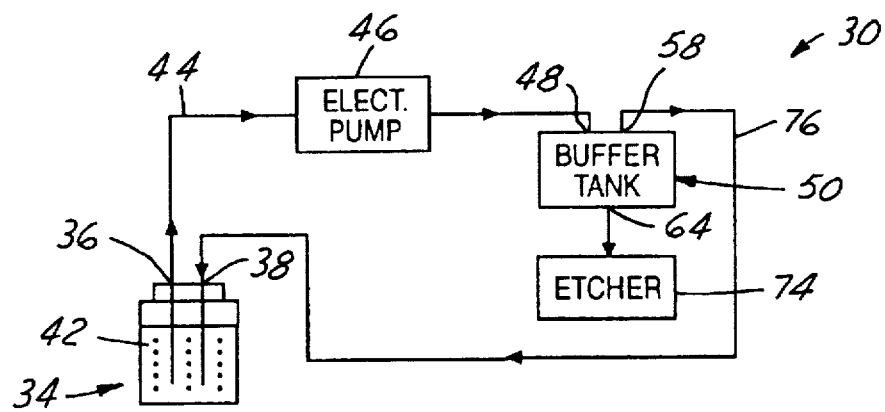
FIG. 2
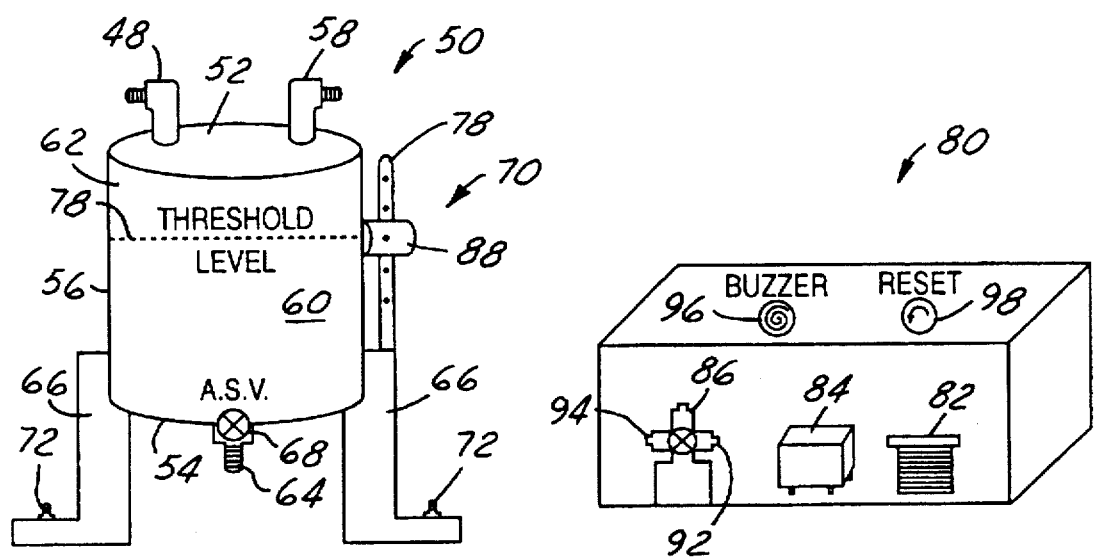
FIG. 3
FIG. 4

METHOD AND APPARATUS FOR ELIMINATING TRAPPED AIR FROM A LIQUID FLOW

FIELD OF THE INVENTION

The present invention generally relates to a method and apparatus for eliminating trapped air from a liquid flow and more particularly, relates to a method and apparatus for eliminating trapped air from a liquid flow used in a semiconductor fabrication process by utilizing a buffer tank and a control box for cumulating air bubbles in the tank.

BACKGROUND OF THE INVENTION

In semiconductor processing, a semi-conducting wafer must be processed in a multiplicity of manufacturing steps, i.e., sometimes as many as several hundred, in order to complete the fabrication of an IC device. These manufacturing steps may include etching, cleaning, deposition and various other processing procedures. A variety of chemicals, including liquids and gases must be used in the various processing steps either to etch a specific feature on the wafer, to clean after certain processing steps, to deposit layers from reactant chemicals, or to carry out other necessary processing steps.

A variety of specialty chemicals are used in chemical stripping and metal cleaning processes. An important requirement for such speciality solvent, i.e., deionized water, cleaning solvents and stripping solvents is the transporting and storage of the materials. In the case of a metal etching process, the cleaning of the wafer after metal etching by water or water vapor to strip all the chemicals is very important. A conventional deionized water cleaning system for a metal etcher is shown in FIG. 1.

As shown in FIG. 1, a deionized water cleaning system 10 generally consists of a liquid reservoir or a holding tank 12, an electrical pump 16, a filter means 18 for delivery of deionized water to a semiconductor fabrication equipment such as a metal etcher 20. The filter means 18 is a device wherein air bubbles trapped in the deionized water can be separated from the solution and be released out of the system through a valve (not shown). During a fabrication process when deionized water 14 contained in the holding tank 12 is pumped by the electric pump 16, air bubble can be generated and trapped in the deionized water contained in the flow passage 22. When the deionized water containing air bubbles passes through the flow passage 22 and enters into the filter means 18, air bubbles are more likely separated and accumulated to the top of the filter means 18. A supply of deionized water is then released from outlet 26 to a semiconductor fabrication equipment, such as a metal etcher 20 shown in FIG. 1. During normal operations, air bubbles are frequently generated in the deionized water supply loop 22 and 32. When a large volume of air bubbles is generated, i.e., during a maintenance procedure of filter replacement or during a deionized water change in holding tank 12, the filter means 18 can not effectively exhaust the air bubbles. In other words, the filter means 18 is no longer effective in separating and accumulating the air bubbles when the volume of the bubbles exceeds a large amount.

Since the presence of air bubbles in the deionized water decreases the amount of water, the amount of water that is available for rinsing etchant from the surface of the wafer after metal etching is correspondingly reduced. When water vapor is used for stripping etchant after a metal etching process air bubbles reduce the volume of water vapor that is fed into the stripping process. Since chlorine is frequently used in a metal etching process, an insufficient water vapor supply in the process tank for the stripping process leaves residual chlorine on the surface of the wafer. This leads to an insufficient passivation process subsequently conducted and thus, chlorine and water vapor combines to produce acid and causes severe metal corrosion problems.

Aluminum wiring used in high density semiconductor circuits contains copper and since copper does not produce passivating oxide, aluminum-copper alloy used in metal wiring is vulnerable to corrosion. The major source of corrosion of aluminum wires comes from the etching compound and the etching by-products that contain chlorine. Chlorine by reacting with water to produce hydrochloric acid, is a major contributor to the corrosion of aluminum. Only a small amount of chlorine is needed to cause a severe local corrosion of aluminum lines since chlorine ions recycle themselves during the chemical process of corrosion. It is known that most chemicals used for the dry etching of aluminum by a reactive ion etching method contain chlorine, aluminum chloride or similar compounds can also form on the aluminum surface after a plasma etching process. When the aluminum surface is exposed to moisture contained in air, the reaction between aluminum chloride and the moisture also produces hydrochloric acid and thus the corrosion of aluminum can occur quickly after a metal etching process. To prevent such metal etching-induced corrosion, chlorine compounds must be removed from the metal surface immediately after a plasma etching process by a water rinse or a water vapor treatment. When the amount of water or water vapor is reduced by the presence of air bubbles, inadequate rinsing of the metal surface occurs and residual chlorine remains on the surface of the metal. Metal corrosion problem on the surface of a wafer leads to a complete failure of the IC circuit produced and therefore has a detrimental effect on the product yield.

It is therefore an object of the present invention to provide a method of eliminating trapped air from a liquid flow that does not have the drawbacks or shortcomings of a conventional method for removing trapped air.

It is another object of the present invention to provide a method for eliminating trapped air in a liquid flow by utilizing a buffer tank for separating and accumulating air bubbles such that a substantially bubble-free liquid flow can be utilized in a semiconductor process equipment.

It is a further object of the present invention to provide a method for eliminating trapped air from a liquid flow by utilizing a buffer tank and an electrical control box such that the liquid flow can be automatically shut-off when a sensor detects a liquid level in the tank below a threshold level.

It is still another object of the present invention to provide a method for eliminating trapped air from a liquid flow by utilizing a buffer tank and an electrical control device such that the liquid flow can be automatically shut-off or turn-on when a sensor detects a liquid level that is below or above a threshold level, respectively.

It is yet another object of the present invention to provide a method for eliminating trapped air from a liquid flow by utilizing a buffer tank and withdrawing a liquid flow from the bottom of the tank that is substantially without air bubbles for use in a semiconductor processing equipment.

It is another further object of the present invention to provide an apparatus for eliminating trapped air from a liquid flow by utilizing a buffer tank for collecting air bubbles, and an electrical control box for automatically sensing the liquid level in the tank and thereby shutting-off the liquid flow when the level drops below a threshold value.

SUMMARY OF THE INVENTION

In accordance with the present invention a method and apparatus for eliminating trapped air from a liquid flow by utilizing a buffer tank and an electrical control box to supply a substantially air bubble-free liquid flow to a semiconductor processing equipment are provided.

In a preferred embodiment, a method for eliminating trapped air from a liquid flow can be carried out by first providing a liquid holding tank that has a top surface, a bottom surface and a generally cylindrical sidewall connecting the two surfaces, then providing a first liquid inlet and a first liquid outlet on the top surface that are in fluid communication with a cavity contained in the holding tank, then providing a second liquid outlet on or near a bottom surface of the tank that is in fluid communication with the cavity in the tank, then flowing a liquid flow into the first liquid inlet and filling the cavity substantially to the top, then flowing a liquid flow out of the first liquid outlet into a liquid circulating means and reentering the liquid flow into the first liquid inlet such that substantially all trapped air is accumulated at the upper portion of the liquid holding tank, and withdrawing a liquid flow that is substantially without trapped air from the second liquid outlet.

The present invention is also directed to an apparatus for eliminating trapped air in a liquid flow which includes a liquid holding tank that has a top surface, a bottom surface that is generally parallel to the top surface and a cylindrical sidewall connecting the two surfaces, a top liquid inlet and a top liquid outlet in the top surface that are in fluid communication with a cavity in the holding tank, at least one bottom liquid outlet in or near the bottom surface of the holding tank that is in fluid communication with the cavity in the holding tank, and a liquid circulating means positioned between and connected to the top liquid inlet and the top liquid outlet by a passage means such that a liquid flow substantially fills the cavity in the holding tank and circulates between the top liquid inlet and the top liquid outlet to accumulate substantially all the trapped air in an upper portion of the cavity in the holding tank, such that a liquid flow which is substantially free of trapped air can be outputted from the at least one bottom liquid outlet.

The present invention is further directed to an apparatus for removing air bubbles in a circulating liquid flow used in a semiconductor fabrication equipment which includes a liquid reservoir which has a first liquid inlet and a first liquid outlet positioned in a top surface of the reservoir that are in fluid communication with a cavity in the reservoir, a passage means for providing fluid communication between the first liquid inlet and the first liquid outlet, a pump for circulating a liquid between the first liquid inlet and the first liquid outlet to substantially fill the cavity and to accumulate air bubbles in a top portion of the cavity, and a second liquid outlet positioned at or near a bottom surface of the reservoir that is in fluid communication with the cavity and the semiconductor fabrication equipment such that a liquid flow that is substantially without air bubbles is supplied to the equipment.

BRIEF DESCRIPTION OF THE DRAWINGS

These and other objects, features and advantages of the present invention will become apparent from the following detailed description and the appended drawings in which:

FIG. 1 is a schematic illustrating a conventional deionized water cleaning system.

FIG. 2 is a schematic illustrating a present invention apparatus for eliminating trapped air from a liquid flow.

FIG. 3 is a schematic illustrating the present invention buffer tank in detail.

FIG. 4 is a schematic illustrating the electrical control box for the present invention apparatus.

DETAILED DESCRIPTION OF THE PREFERRED EMBODIMENT

The present invention provides a method and apparatus for eliminating trapped air from a liquid flow by utilizing a buffer tank and an electrical control box such that air bubbles can be trapped and accumulated in the buffer tank and further, the liquid flow can be stopped automatically when the liquid level in the tank falls below a threshold level.

Referring initially to FIG. 2, wherein a present invention apparatus 30 for eliminating trapped air from a liquid flow is shown. In apparatus 30, a liquid reservoir 34 is first provided which has a liquid outlet 36 and a liquid inlet 38. The present invention novel apparatus for eliminating trapped air from a liquid flow operates in the following manner, a fresh supply of a liquid 42, such as deionized water, is first delivered from reservoir 34 through the liquid outlet 36 and passageway 44 by the electric pump 46 into a liquid inlet 48 on the buffer tank 50. A detailed perspective view of the buffer tank 50 is shown in FIG. 3.

The buffer tank 50 is a liquid holding tank that has a top surface 52, a bottom surface 54 and a generally cylindrical sidewall 56 connecting the top and the bottom surfaces. A first liquid inlet 48 and a first liquid outlet 58 are provided on the top surface 52 which are in fluid communication with cavity 60 in the liquid holding tank 50. A second liquid outlet 64 is provided on or near the bottom surface 54 which is in fluid communication with cavity 60 in the holding tank 50. The opening in the second liquid outlet 64 is controlled by an air solenoid valve 68. The liquid holding tank 50 can be constructed of a variety of materials, however, it would be beneficial to construct the tank in a corrosion-resistant material such that it can be used to contain various processing fluids that are normally used in semiconductor fabrication processes. A convenient material to be used in the present invention novel apparatus is TEFLON® (carbon tetrafluoride) which is solvent resistant and corrosion resistant. The liquid holding tank 50 can be conveniently installed on a plurality of support structures 66 which can then be permanently fixed to a fabrication equipment or a suitable place by mechanical mounting means such as screws 72.

Another novel feature of the present invention is the sensing device 70 which is constructed of a sensor head 88 mounted on an adjustable support 78. The sensor head 88 may utilize a variety of sensing technologies, such as optical, ultrasonic or any other suitable sensing technologies. The sensor head 88 is normally set at a desirable height of the liquid level in cavity 60 of the liquid holding tank 50. When excessive amount of air bubbles are accumulated in the cavity 60, and specifically at an upper portion 62 of the cavity such that liquid level drops below the threshold level 78, the sensor head 88 detects no liquid at the threshold level 78 and therefore sends a signal to an electrical control box 80.

The electrical control box 80, as shown in FIG. 4, is constructed of a transformer 82 of the AC 16V 50/60 Hz type, a relay 84, and an air solenoid valve controller 86. The end 92 of the air solenoid valve controller 86 is connected to a compressed dry air source for supplying to the air solenoid valve 68 on the liquid holding tank 50 for opening or closing of the valve 68. The other end 94 of the air solenoid valve controller 86 is connected to the air solenoid valve 68 for opening or closing the valve. The electrical control box 80 further includes a buzzer alarm 96 for sending out a warning when the liquid level is dropped below the threshold level 78, and a reset button 98 for resetting the controller. At the bottom of the liquid holding tank (or buffer tank) 50, the second liquid outlet 64 supplies a liquid flow to a semiconductor fabrication equipment, such as a metal etcher 74 (shown in FIG. 2) that is substantially air bubble-free when the liquid flow is a deionized water.

In practice, the buffer tank 50 can be installed at a deionized water inlet of a metal etcher. When there is no air bubbles flowing into the buffer tank 50, the tank functions as a regular water reservoir. When a small amount of air bubbles is flown into the tank 50, the buffer tank separates the air and water and drain out the air bubbles from the deionized water return line 76 (shown in FIG. 2). When a large amount of air bubbles is accumulated in the buffer tank 50, the bubbles will be trapped on the top portion 62 of the tank and as a consequence, drops the liquid level to below the threshold level 78. The sensor head 88 detects the low liquid level and sends a warning signal to control box 80. The control box 80 then sounds a buzzer alarm and turns off the air solenoid valve 68 to stop the deionized water supply and thus preventing any air bubble from flowing into the metal etcher's vapor delivery system. After the air bubbles are drained through the deionized water return line 76, the liquid level rises above the threshold level 78 so that the sensor head 88 sends a signal to control box 80 to open the air solenoid valve 68, to stop the buzzer alarm, and to resume the delivery of deionized water to the metal etcher 74.

It should be noted that while a delivery system for deionized water to a metal etcher is used as an example to illustrate the novel features of the present invention method and apparatus, the present invention method and apparatus can be applied to any other liquid delivery systems that is normally used in either a semiconductor fabrication processes or in any other chemical processes as long as the elimination of trapped air from a liquid flow is desired.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

We claim:

1. A method for eliminating trapped air from a liquid flow used in a semiconductor process comprising the steps of:

providing a liquid holding tank having a top surface, a bottom surface and a generally cylindrical sidewall connecting the two surfaces, providing a first liquid inlet and a first liquid outlet on the top surface in fluid communication with a cavity in said liquid holding tank, providing a second liquid outlet on or near said bottom surface in fluid communication with said cavity in said liquid holding tank, flowing a liquid flow into said first liquid inlet and filling said cavity substantially to the top surface, flowing said liquid flow out of said first liquid outlet into a liquid circulating means and re-entering the liquid flow into the first liquid inlet such that substantially all trapped air is accumulated at or near the top surface of the liquid holding tank, and withdrawing a liquid flow that is substantially without trapped air from said second liquid outlet and flowing said liquid flow to a semiconductor fabrication process.

2. A method according to claim 1, wherein said liquid flow that is substantially without trapped air is deionized water withdrawn for use in a semiconductor fabrication process.

3. A method according to claim 1, wherein said method is conducted in a closed-loop deionized water recirculating process.

4. A method according to claim 1, wherein said trapped air exists in the form of air bubbles.

5. A method according to claim 1 further comprising the step of positioning a sensor means on said generally cylindrical shaped sidewall for sensing the liquid level in said holding tank.

6. A method according to claim 5 further comprising the step of providing a control means for automatically shutting-off said liquid flow when said sensor means detects a liquid level that is below a threshold level.

7. A method according to claim 5 further comprising the step of providing an electrical control means for automatically shutting-off or turning-on said liquid flow when said sensor means detects a liquid level that is below or above a threshold level, respectively.

8. A method according to claim 1, wherein said first liquid outlet on the top surface of said liquid holding tank is further equipped with means for draining a liquid flow containing trapped air.

9. A method according to claim 1, wherein said second liquid outlet on or near said bottom surface of the holding tank is in fluid communication with a deionized water supply line of a metal etcher.

10. An apparatus for eliminating trapped air in a liquid flow for use in a semiconductor process machine comprising:

a liquid holding tank having a top surface, a bottom surface generally parallel to said top surface and a cylindrical sidewall connecting the two surfaces, a top liquid inlet and atop liquid outlet in said top surface in fluid communication with a cavity in said holding tank, at least one bottom liquid outlet in or near said bottom surface of the holding tank in fluid communication with said cavity in the holding tank, and a liquid circulating means positioned between and connected to said top liquid inlet and said top liquid outlet by passage means such that a liquid flow substantially fills said cavity in said holding tank and circulates between said top liquid inlet and said top liquid outlet to accumulate essentially all of the trapped air in an upper portion of said cavity in said holding tank, and that a liquid flow which is substantially free of trapped air is outputted from said at least one bottom liquid outlet to a semiconductor process machine.

11. An apparatus according to claim 10, wherein said liquid circulating means is an electric pump.

12. An apparatus according to claim 1 further comprising a drain in said passage means connected between said top liquid inlet and said top liquid outlet for draining trapped air from said cavity of the holding tank.

13. An apparatus according to claim 10, wherein said liquid holding tank is constructed of a material that is substantially corrosion resistant.

14. An apparatus according to claim 10 further comprising a liquid level detection means for detecting the liquid level in said holding tank.

15. An apparatus according to claim 10 further comprising a liquid level detection means and an electrical control means such that the liquid flow can be shut-off when said liquid level detection means detects a level that is below a threshold level.

16. An apparatus according to claim 10, wherein said apparatus is connected to a semiconductor fabrication equipment for circulating deionized water.

17. An apparatus for removing air bubbles in a circulating liquid flow used in a semiconductor fabrication equipment comprising:

a liquid reservoir having a first liquid inlet and a first liquid outlet positioned in a top surface of said reservoir in fluid communication with a cavity in said reservoir, a passage means for providing fluid communication between said first liquid inlet and said first liquid outlet, a pump means for circulating a liquid between said first liquid inlet and said first liquid outlet to substantially fill said cavity and to accumulate trapped air in a top portion of said cavity, and a second liquid outlet positioned at or near a bottom surface of the reservoir in fluid communication with said cavity and said semiconductor processing equipment such that a liquid flow that is substantially without air bubbles is supplied to said equipment.

18. An apparatus according to claim 17, wherein said semiconductor fabrication equipment is a metal etcher and said liquid as deionized water.

19. An apparatus according to claim 17 further comprising a liquid level sensing means for detecting the liquid level in said reservoir and a control means for shutting off said liquid flow when the liquid level in the reservoir is below a predetermined threshold level.

* * * * *